United States Patent [19]

Kosugi

[11] Patent Number: 5,498,031
[45] Date of Patent: Mar. 12, 1996

[54] AIR BAG DEVICE WITH INFLATION REGULATION LUG

[75] Inventor: Noriyuki Kosugi, Shiga, Japan

[73] Assignee: Takata Corporation, Tokyo, Japan

[21] Appl. No.: 392,176

[22] Filed: Feb. 22, 1995

[30] Foreign Application Priority Data

Apr. 5, 1994 [JP] Japan ..................... 6-067007

[51] Int. Cl.⁶ ................................. B60R 21/20
[52] U.S. Cl. ...................... 280/743.2; 280/743.1
[58] Field of Search .................. 280/743.14, 743.20, 280/728.1, 731, 732

[56] References Cited

U.S. PATENT DOCUMENTS

| | | | |
|---|---|---|---|
| 5,333,903 | 8/1994 | Eyrainer et al. | 280/743.1 |
| 5,358,273 | 10/1994 | Onishi et al. | 280/743.1 |
| 5,362,101 | 11/1994 | Sugiura et al. | 280/743.2 |
| 5,380,038 | 1/1995 | Hawthorn et al. | 280/743.1 |

FOREIGN PATENT DOCUMENTS

| | | | |
|---|---|---|---|
| 4142326 | 6/1993 | Germany | 280/743.1 |
| 0122751 | 5/1989 | Japan | 280/743.2 |
| 2263448 | 7/1993 | United Kingdom | 280/743.2 |

*Primary Examiner*—Christopher P. Ellis
*Attorney, Agent, or Firm*—Kanesaka & Takeuchi

[57] ABSTRACT

An air bag device to be mounted in a steering wheel of a vehicle comprises an air bag, an inflator which generates to deploy the air bag, a retainer to which the air bag and the inflator are attached, and a cover attached to the retainer to cover the air bag, wherein the air bag device has lugs on the periphery of the air bag. Each of the lugs is attached to the retainer and has tear strength such that the lug is torn by the tensile force applied to the air bag after it is deployed in front of the retainer in the process of deployment of the air bag.

15 Claims, 11 Drawing Sheets

AIR BAG DEVICE WITH INFLATION REGULATION LUG

FIELD OF THE INVENTION AND RELATED ART STATEMENT

The present invention relates to an air bag for protecting an occupant when a vehicle comes into collision.

An air bag device is equipped with elements such as a folded air bag and an inflator for deploying the air bag. A driver side air bag device is mounted on a retainer and is covered by a module cover. The retainer is located within a steering wheel of a vehicle.

When the vehicle comes into collision, the inflator spouts out gas so as to deploy the air bag. Tearing the module cover open, the air bag is deployed between the steering wheel and an occupant.

The driver side air bag is desired to be deployed rapidly in all directions of the occupant (upward, downward, lefthand, and righthand directions) simultaneously, when the inflator activates.

Figure 18:
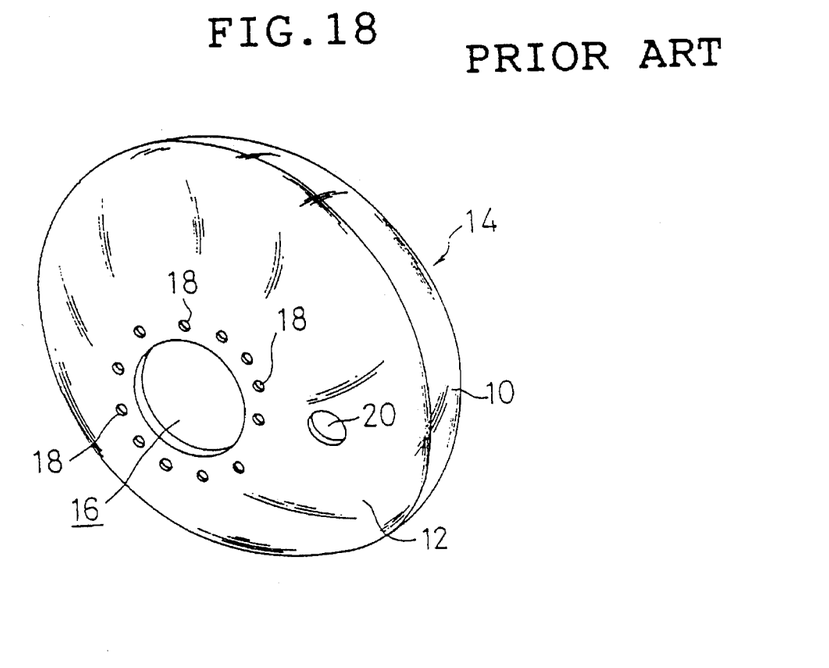
FIG. 18 is a perspective view of a conventional air bag 14.

FIG. 18 is a perspective view of an air bag of a driver side air bag device in a fully deployed state. An air bag main body 14 of the air bag is formed by sewing up respective peripheral borders of two circular fabrics, a front panel 10 and a rear panel 12. The rear panel 12 has an opening 16 in the center thereof to receive a part of the inflator. The opening 16 is surrounded by small holes 18 through which bolts, pins, or rivets are inserted to attach the bag main body 14 to the retainer. The numeral 20 designates a vent hole for letting gas escape from the bag main body 14 when the driver plunges into the air bag.

Figure 19:
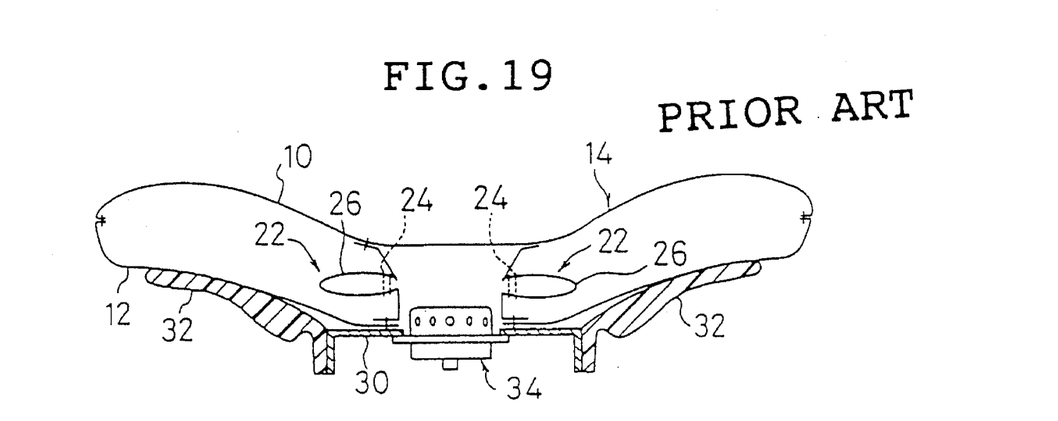
FIG. 19 is a sectional view showing a conventional air bag device in a middle of operation.

The front panel 10 and the rear panel 12 are connected with each other by tether belts 22, to prevent the air bag from protruding forward when deploying, as shown in FIG. 19.

The bag main body 14 is attached to a retainer 30, and covered with a module cover 32. When the air bag is deployed by the gas from an inflator 34, the module cover 32 tears open as illustrated. The tether belts 22 are stretched tightly when the air bag is deployed, thereby preventing the front panel 10 from further extending forward.

As the air bag is preferable to be deployed rapidly in all directions simultaneously, the tether belts 22 may be basted with sewing threads 24 in the middle thereof so as to form loops 26 to shorten the length of the tether belts 22 as shown in FIG. 19.

When the air bag is deployed by the gas from the inflator, the bag main body 14 is deployed quickly on all sides as the tether belts 22 are shortened by the loops 26, as shown in FIG. 19. After the air bag is deployed sufficiently in all directions, the gas pressure from the inflator acts mainly as a pressure pushing the front panel 10 forward. As the result, the sewing threads 24 snap, thereby the tether belts 22 are extended, and the front panel 10 moves forward.

An air bag device for an occupant in a passenger seat or a rear seat is installed in an instrument panel or a seat back of a front seat of a vehicle. When an inflator activates, an air bag pushes a lid to open it and then the bag is deployed in a cabin of a vehicle.

A conventional air bag device for an occupant in a passenger seat or a rear seat is structured to be deployed in front of the upper body of the occupant.

OBJECT AND SUMMARY OF THE INVENTION

The driver side air bag with tether belts 22 wherein the loops 26 are formed with the sewing threads 24, as shown in FIG. 19, requires both ends of a plurality of tether belts 22 to be sewn to the front panel and the rear panel, respectively. Accordingly, it takes time to manufacture the air bag. Also, the plurality of tether belts inside the air bag increase the volume of the folded air bag.

It is therefore an object of the present invention to provide a driver side air bag device, an air bag of which can be manufactured easily.

It is another object of the present invention to provide a driver side air bag device with a small packaging volume when folded.

It has been found after repeated experiments that occupants are sufficiently protected by restraining only the waist portion of a seated occupant with the air bags.

It is a further object of the present invention to provide an air bag device for an occupant in a passenger seat or a rear seat which can sufficiently protect the occupant with even reduced volume of the air bag.

In a first embodiment, an air bag device to be mounted in a steering wheel of a vehicle comprises an air bag, an inflator for generating gas to deploy the air bag, a retainer to which the air bag and the inflator are attached, a cover attached to the retainer to cover the air bag, and at least one lug disposed on the peripheral border of the air bag and connected to the retainer. The lug has tear strength such that the lug is torn by tensile force applied to the air bag after the air bag is deployed in front of the retainer in the process of the deployment of the air bag.

As for the driver air bag device described in the first embodiment, the air bag starts to be deployed when the inflator activates, and the cover is torn open.

At this stage, since the lug provided around the air bag is connected to the retainer, the air bag is deployed such that the front panel side becomes taut first. Subsequently, the tensile force exceeds the limit of strength of the lug, so that the lug tears. Then, the air bag is deployed widely in the sideward, upward and downward directions. The air bag deployed in such a manner comes to extend between the steering wheel and the chest of the driver.

In a second embodiment, an air bag device for an occupant in a passenger seat or a rear seat, which is mounted in front of the seat of a vehicle, comprises an air bag, an inflator for generating gas to deploy the air bag, a casing to which the air bag and the inflator are attached, and a lid attached to the casing to cover the air bag. The air bag is provided with a lug disposed at the tip side thereof in the direction of deployment. The lug is connected to the casing and has tear strength such that it is torn by tensile force applied to the air bag after the air bag is deployed in front of the casing in the process of the deployment of the air bag.

The air bag device of the present invention preferably has a vent hole disposed between the lug and the rear end of the air bag. The air bag device for an occupant in a passenger seat or rear seat described in the second embodiment is designed to restrain the occupant by putting the deployed air bag onto the waist portion of the occupant.

As a result of various experiments, it has been found that an air bag which restrains the waist portion of an occupant protects the occupant as effectively as does a conventional air bag which is deployed in front of the upper body of an occupant.

The air bag which is deployed to protect the waist portion of an occupant has a smaller volume than a conventional one which is deployed extensively in front of the upper body of an occupant. Therefore, the air bag can be quickly deployed.

Additionally, it is possible to reduce the capacity of the inflator.

The air bag device of the present invention preferably has a vent hole disposed between the lug and the rear end of the air bag. With this arrangement, the vent hole is blocked by the air bag until in the middle of deployment, thereby preventing the gas inside the air bag from leaking through the vent hole in the initial stage of deployment. Therefore, the deployment can be greatly speeded up.

DESCRIPTION OF THE PREFERRED EMBODIMENTS

Embodiments will be described below with reference to the drawings.

Figure 1:
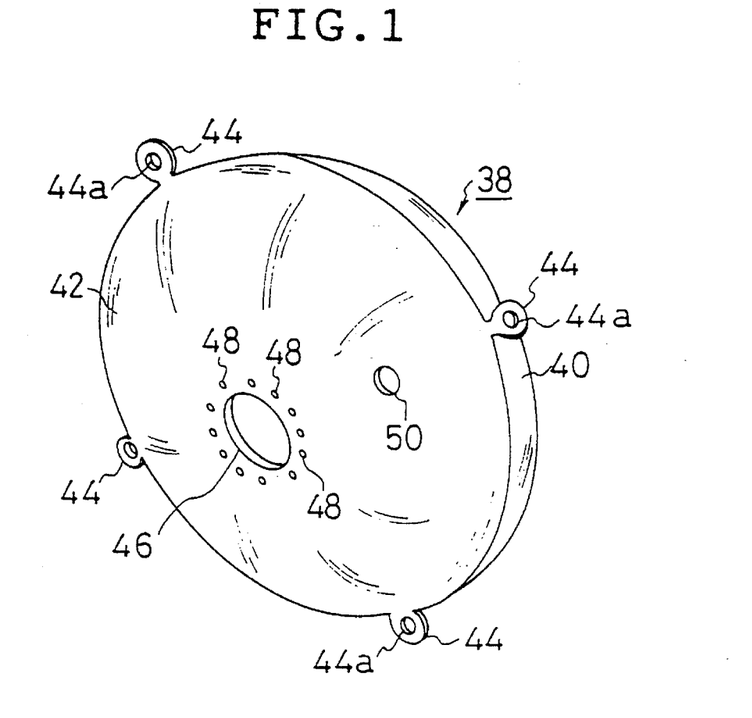
FIG. 1 is a perspective view showing an air bag 38 according to an embodiment of the present invention.
Figure 2:
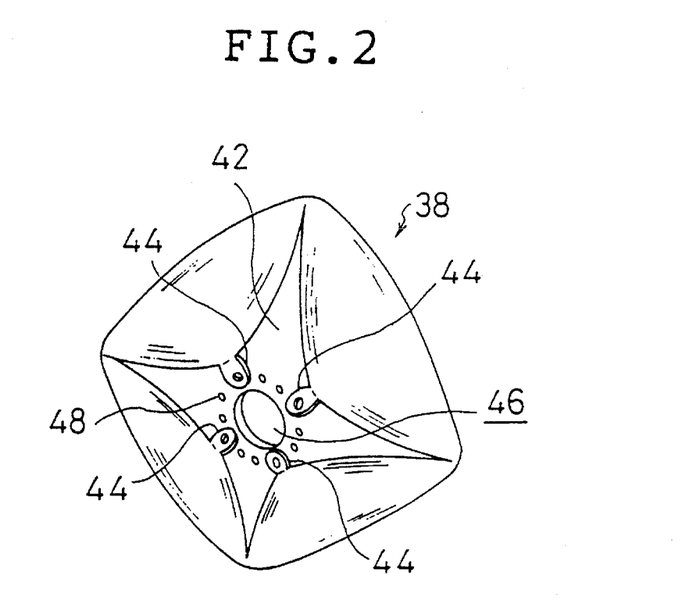
FIG. 2 is a perspective view showing the air bag 38.
Figure 7:
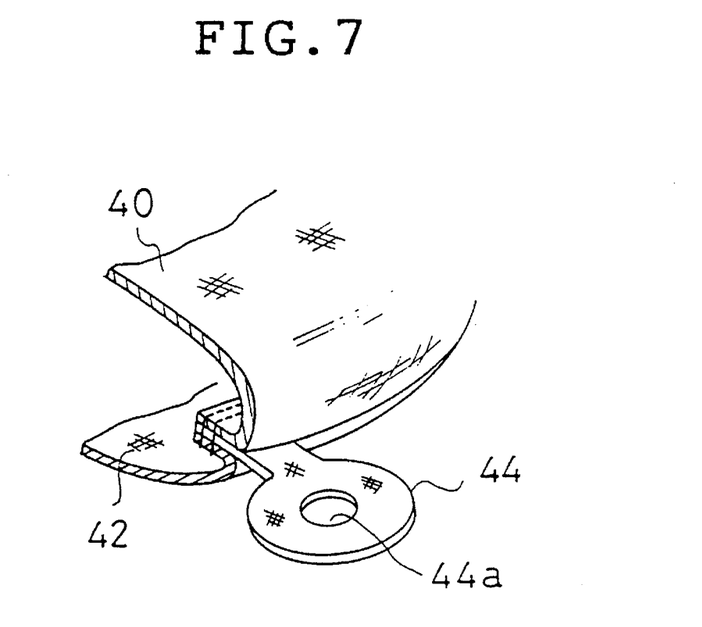
FIG. 7 is a perspective view of a main part of the air bag 38.

FIGS. 1 and 2 are perspective views of a driver side air bag 38, according to an embodiment of the present invention. An air bag main body of the air bag 38 is formed by sewing up the respective peripheral borders of two circular fabrics, a front panel 40 and a rear panel 42. As shown in FIG. 7, lugs 44 are inserted and sewn between the peripheral borders of panels 40 and 42 so that the lugs 44 are disposed around the periphery of the air bag 38.

The rear panel 42 has an opening 46 in the center thereof, which receives a part of the inflator. The opening 46 is surrounded by small holes 48 through which bolts, pins, or rivets are inserted to attach the air bag 38 to a retainer. The numeral 50 designates a vent hole for letting gas escape from the air bag 38 when the driver plunges into the air bag.

As shown in FIGS. 3 to 6, the bag 38 is attached to a retainer 52 and covered with a module cover 54.

Figure 3:
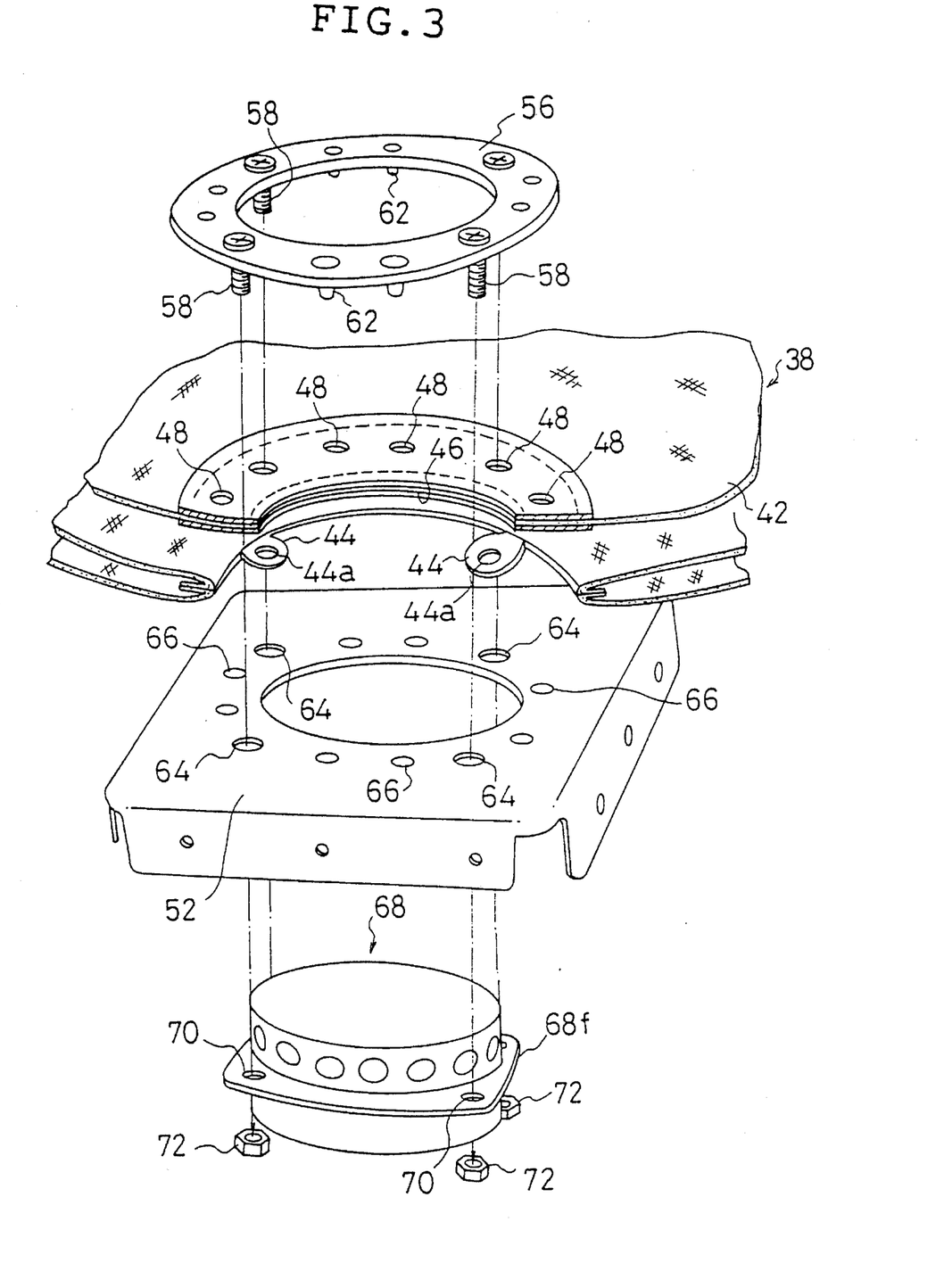
FIG. 3 is an exploded perspective view of main parts of the air bag device according to the embodiment.

In this embodiment, a ring 56 is employed to attach the air bag 38 to the retainer 52. Bolts 58 and pins 62 protruding from the ring 56 are inserted through small holes 48 and also inserted through bolt insertion holes 64 and pin insertion holes 66 of the retainer 52, respectively. These bolts 58 are inserted into holes 70 of a flange 68f of an inflator 68, and then tighten by nuts 72.

The air bag 38 is folded back to the rear panel 42 side, as shown in FIGS. 2 and 3, and the lugs 44 are aligned with the small holes 48, and the bolts 58 are also inserted into the openings 44a of the lugs 44.

Figure 5:
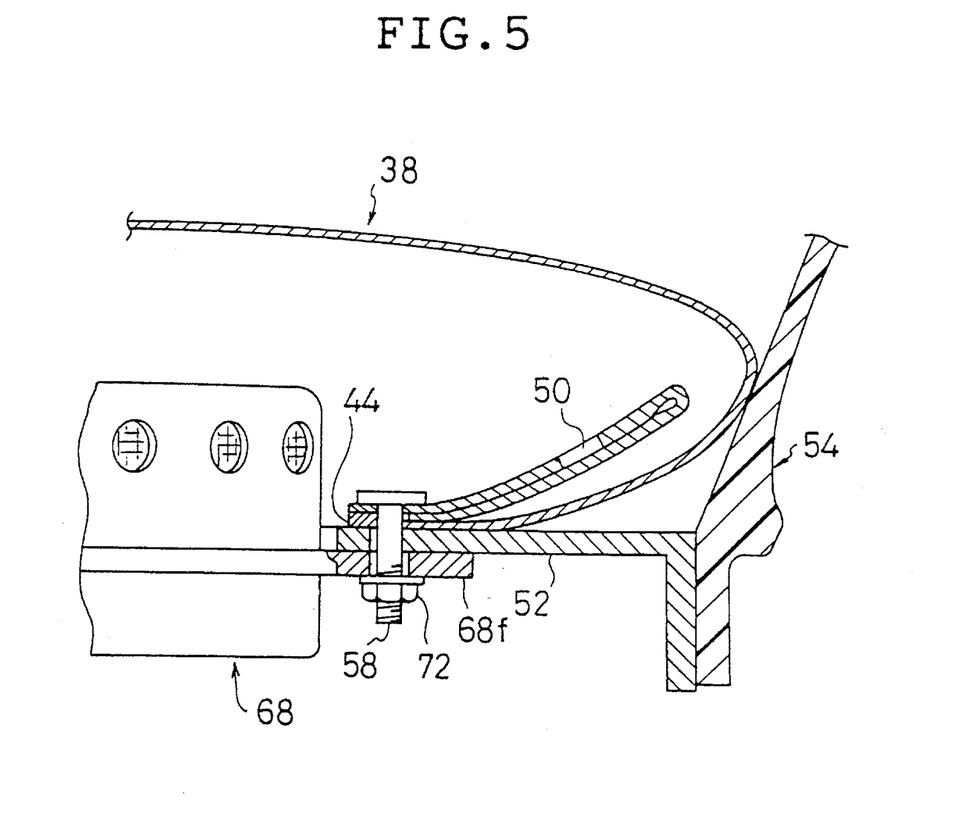
FIG. 5 is an enlarged view of the V portion in FIG. 4.

As shown in FIGS. 2 and 5, the vent hole 50 of the air bag 38 is blocked by a folding part of the air bag 38.

Figure 4:
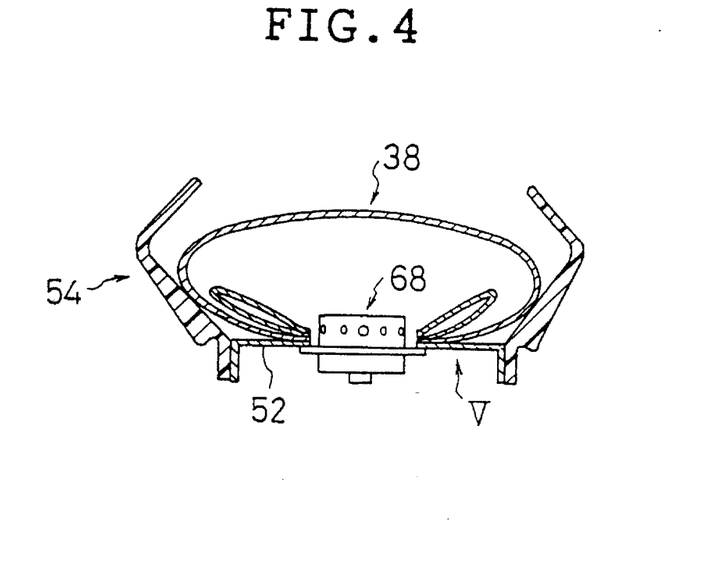
FIG. 4 is a sectional view showing the air bag device in action in accordance with the embodiment.

When a vehicle equipped with the air bag device comes into collision and the inflator 68 spouts out gas, the air bag 38 begins to be deployed. The module cover 54 tears open first, and the air bag 38 is deployed to the state in which the front panel 40 becomes taut, as shown in FIGS. 4 and 5. When the air bag is deployed to the state shown in FIGS. 4 and 5, large tensile force is applied to the lugs 44 which thereby subsequently are torn at the bases thereof. The air bag 38 then is deployed extensively in all radial directions, as shown in FIG. 6.

In the state shown in FIGS. 4 and 5, the air bag 38 does not extend any closer to an occupant because the lugs 44 restrain the front panel 40. Further, in this state, as the vent hole 50 is blocked by the air bag 38 as shown in FIG. 5, and the gas does not escape from the air bag 38 through the vent hole 50, the air bag 38 is deployed quickly.

Figure 6:
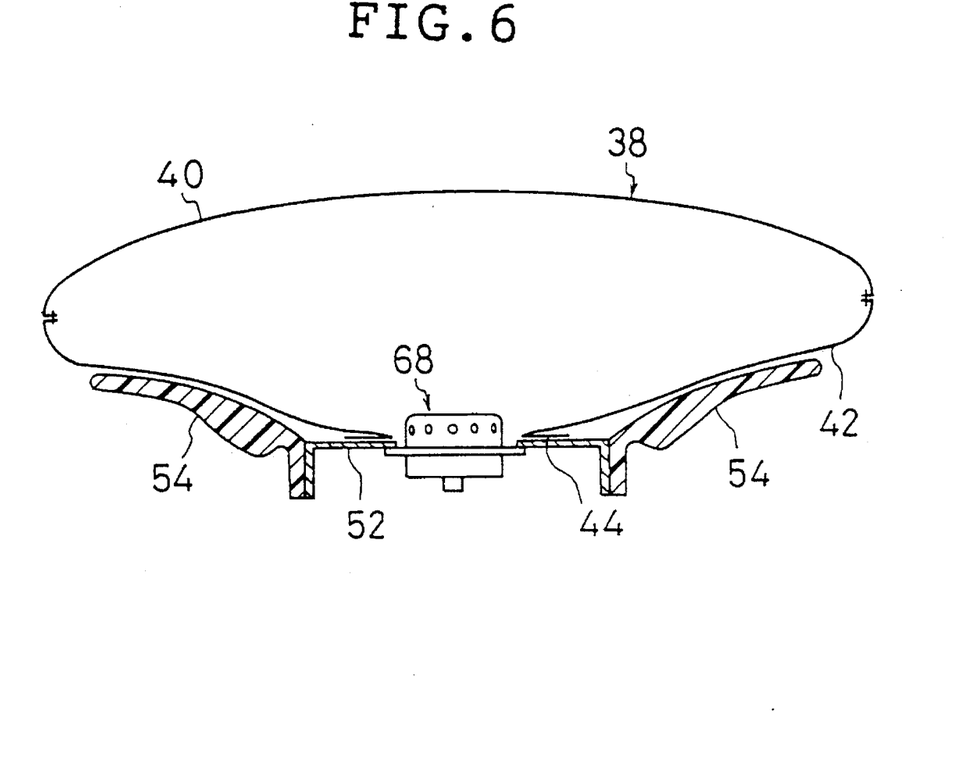
FIG. 6 is a sectional view of the air bag fully deployed of the air bag device according to the embodiment.

The air bag 38 continues to deploy from the state of FIGS. 4, 5 to the state of FIG. 6 wherein the bag 38 is deployed in all radial directions, so that the bag 38 is deployed rapidly between the steering wheel and the upper body (especially chest) of the occupant.

Figure 8:
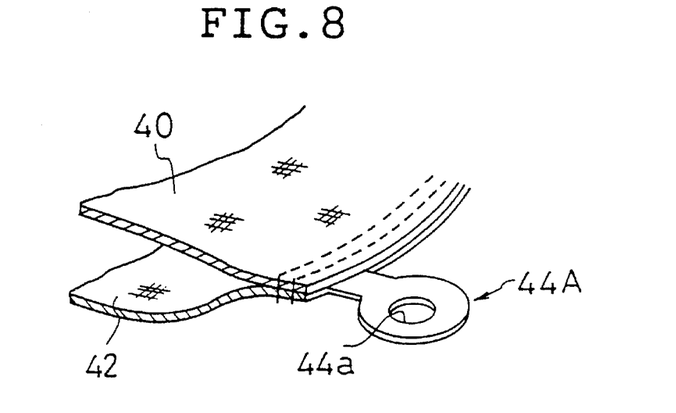
FIG. 8 is a perspective view of a main part of an air bag according to another embodiment.

In this embodiment, the lugs 44 are inserted between the front panel 40 and the rear panel 42 as shown in FIG. 7, but the lugs 44A may be instead integrated into the front panel 40 or the rear panel 42 as shown in FIG. 8.

Figure 9:
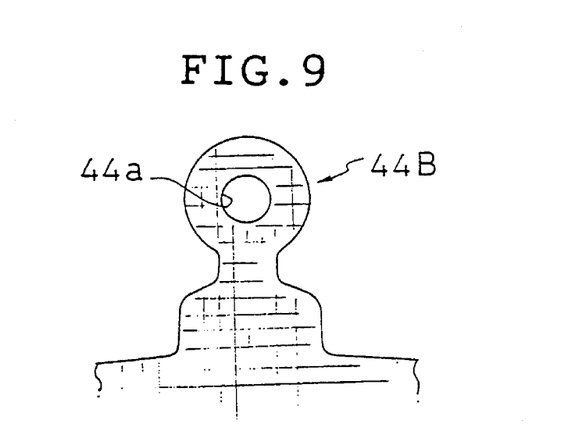
FIG. 9 is a plan view of a lug 44B.
Figure 10:
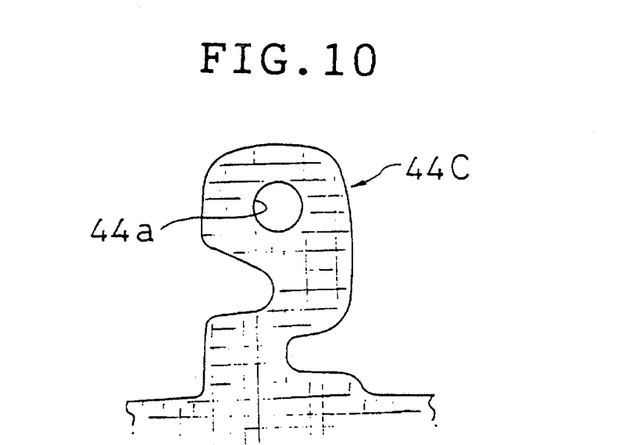
FIG. 10 is a plan view of a lug 44C.

Each of the lugs may be formed like lugs 44B and 44C shown in FIGS. 9 and 10. The lug in FIG. 10 has a base portion in the lug 44C which is torn a relatively low tensile force applied thereto.

Figure 11:
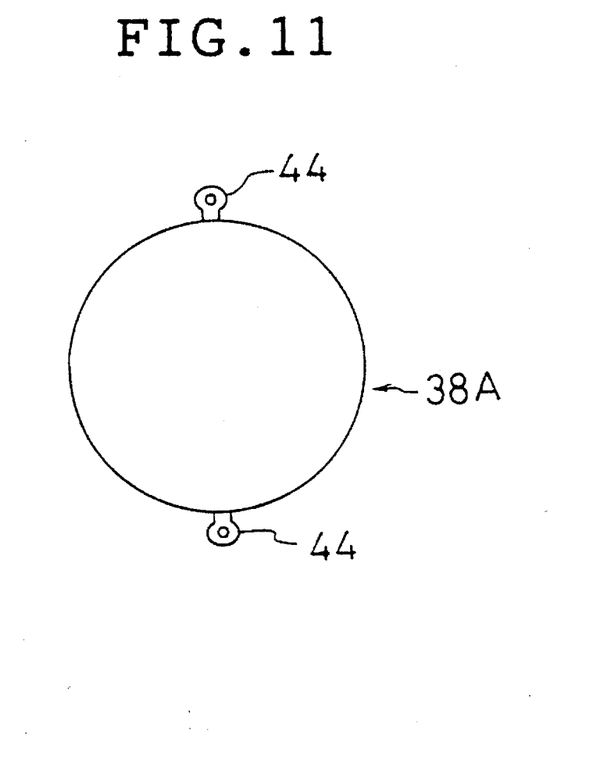
FIG. 11 is a plan view of the air bag 38A.
Figure 12:
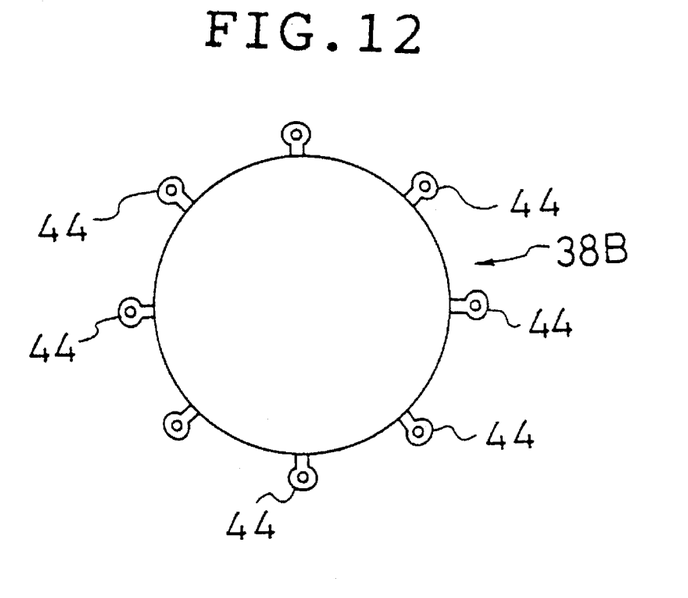
FIG. 12 is a plan view of the air bag 38B.

Although the air bag 38 in the above embodiment is equipped with four lugs 44, the number of lugs may be two or eight as in the air bags 38A and 38B in FIGS. 11 and 12. The suitable number of lugs may be four.

Figure 20:
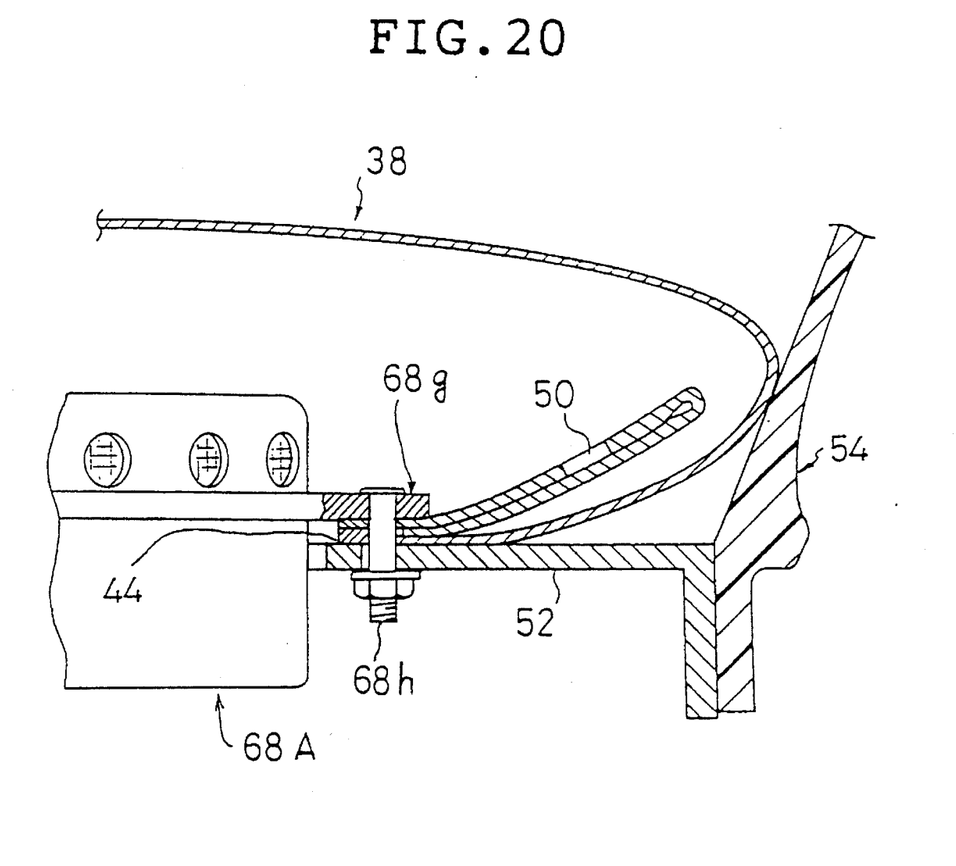
FIG. 20 is a sectional view showing main parts of a further another embodiment.

According to the present invention, as shown in FIG. 20, an inflator 68A which has bolts 68h fixed on a flange 68g thereof may be employed and the lugs 44 may be engaged with the bolts 68h, respectively.

An embodiment of an air bag device for an occupant in a passenger seat (hereinafter, referred to as "a passenger seat air bag device") will be described, with reference to FIGS. 13 through 17.

Figure 17:
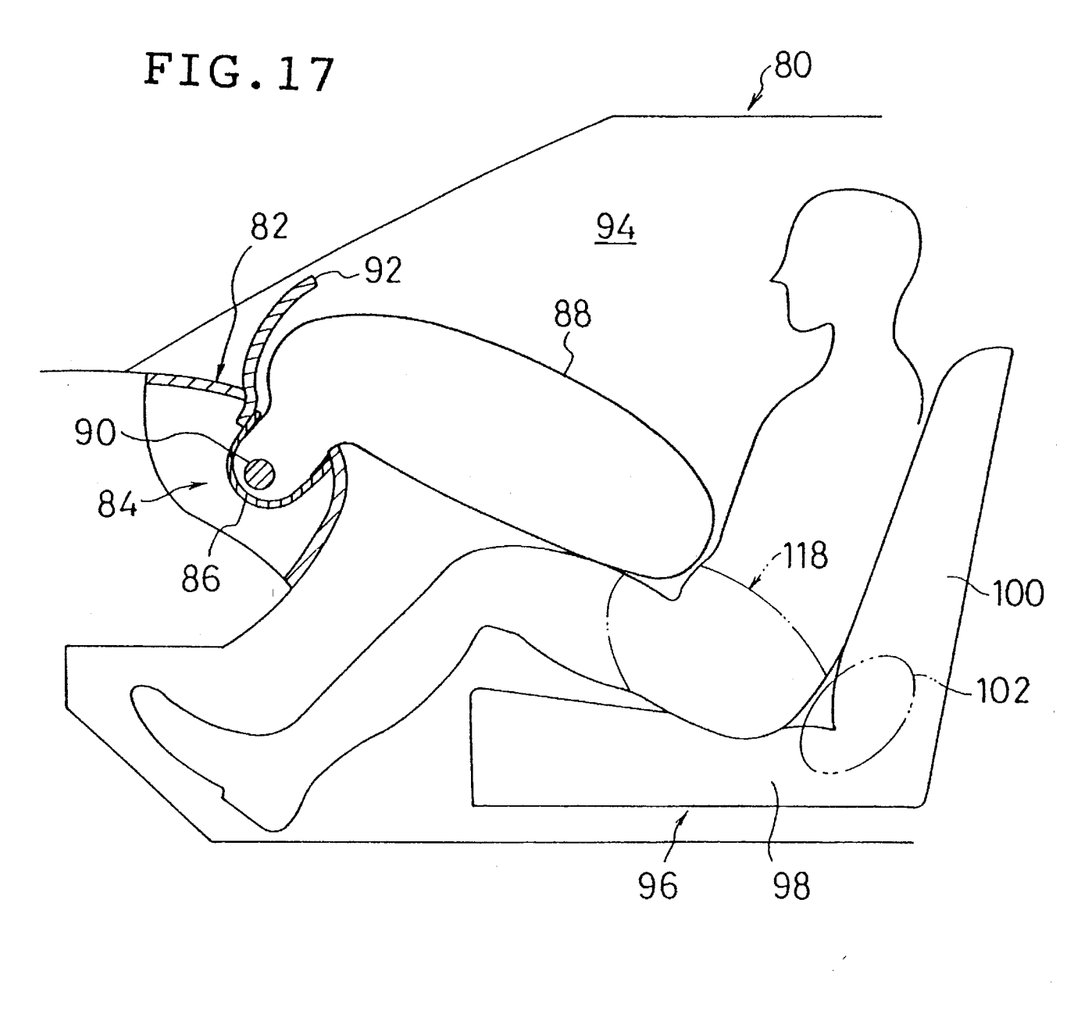
FIG. 17 is a side view showing the inside cabin of a vehicle in which the air bag device according to the embodiment is mounted.

FIG. 17 is a side view showing the inside cabin of a vehicle in which the air bag device according to the embodiment is mounted.

The passenger seat air bag device 84 is mounted in an instrument panel 82 of the vehicle 80. The passenger seat air bag device 84 comprises a casing 86, an air bag 88 folded and accommodated in the casing 86, an inflator 90 which generates gas to deploy the air bag 88, and a lid 92 which covers the casing 86. One side edge of the lid 92 is connected to the casing 86 in a way that it allows the lid 92 to pivot toward the cabin 94 of the vehicle. The other side edge of the lid 92 is attached to the casing 86 in such a fashion that it detaches itself away from the casing 86 by being pushed by the air bag 88 when it is deployed upon the activation of the inflator 90.

The air bag 88 is designed to extend toward the intersection 102 of a seat cushion 98 and a seat back 100 of a seat 96 of the vehicle 80.

Figure 13:
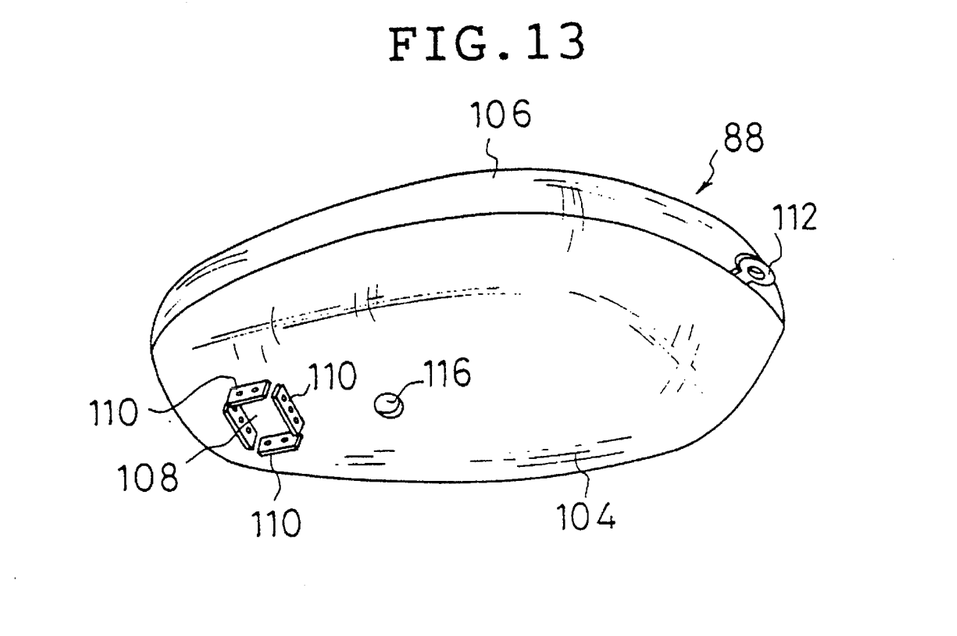
FIG. 13 is a perspective view of an air bag 88 for an occupant in a passenger seat.

In the air bag 88 employed in the embodiment, as shown in the FIG. 13, two fabrics, a lower panel 104 in the bottom and a upper panel 106 on top are sewn together to form an envelope shape. The lower panel 104 has an opening 108 to receive gas from the inflator 90. The opening 108 is surrounded by flaps 110 which are connected to the casing 86.

Figure 15:
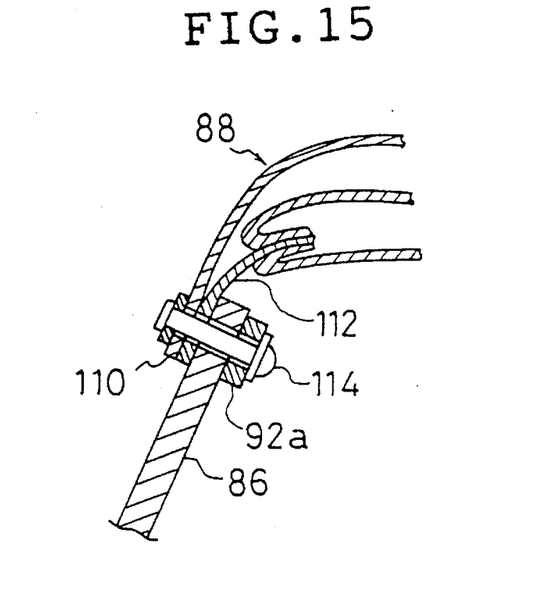
FIG. 15 is an enlarged view of the XV portion in FIG. 14.

The air bag 88 has a lug 112 disposed at the tip thereof. As shown in FIG. 15, one of the flaps 110 is attached to the casing 86 by rivets 114, together with the lug 112 and an attachment portion 92a of the lid 92.

The lower panel 104 has a vent hole 116 for letting gas escape from the air bag 88 when an occupant plunges into the air bag 88. The vent hole 116 is disposed between the lug 112 and the opening 108.

The panels 104 and 106 are each formed to extend long in the longitudinal direction of the vehicle 80, and the opening 108 is located in the air bag 88 at the front side of the vehicle.

Figure 14:
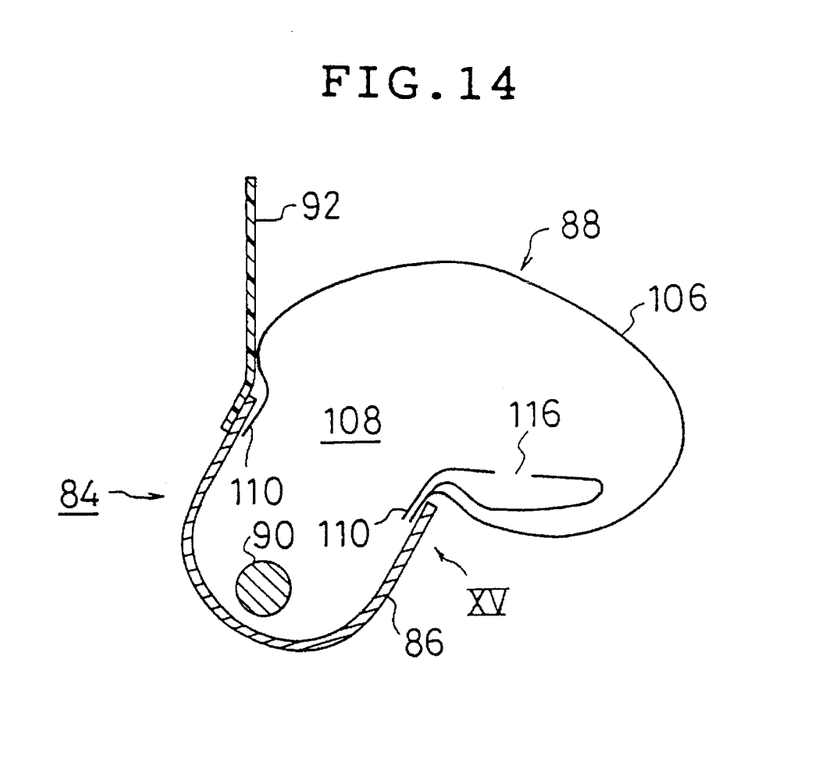
FIG. 14 is a sectional view of an air bag device 84 in a middle of operation in accordance with an embodiment.
Figure 16:
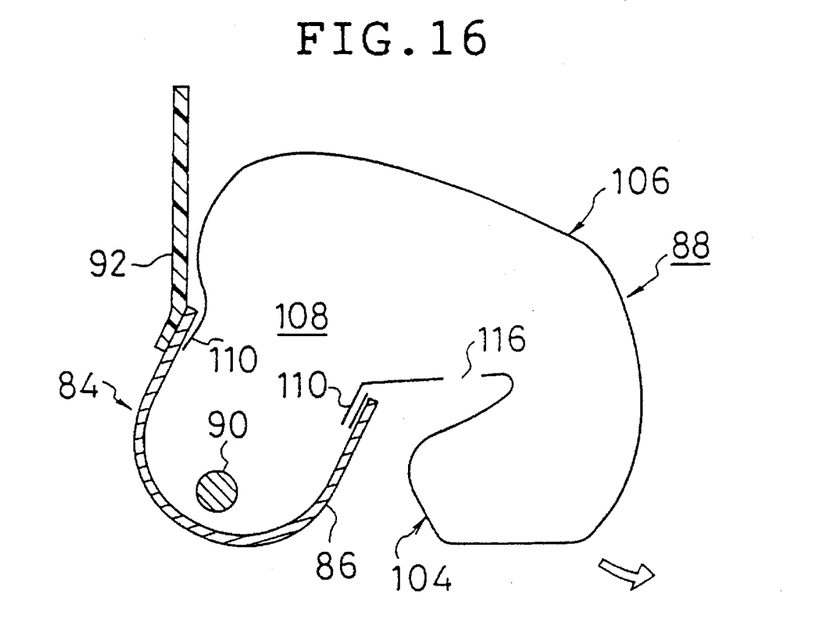
FIG. 16 is a sectional view of the air bag fully deployed of the air bag device 84.

When the vehicle 80 equipped with the air bag device 84 as structured above comes into collision, the inflator 90 spouts out gas, and the air bag 88 begins to be deployed. Pushed by the air bag 88 on deployment, the lid 92 opens toward the cabin 94 of the vehicle, and the air bag 88 is extended into the cabin 94 of the vehicle. As shown in FIG. 14, the bag 88 is deployed in front of the casing 86 so that the upper panel 106 becomes taut. Following the tearing of the lug 112, as shown in FIG. 16, the air bag 88 is deployed towards the intersection 102 of the seat cushion 98 and the seat back 100 of the seat 96 of the vehicle 80. Finally, as shown in FIG. 17, the air bag 88 reaches and restrains the waist portion 118 of the occupant.

As a result of various experiments, it has been found that when the waist portion 118 is restrained by the air bag 88 as mentioned above, the occupant is as effectively protected as by an air bag deployed extensively in front of the upper body of an occupant including the chest and head. Moreover, the air bag may be effective in preventing the lower body of an occupant not wearing a seat belt from sliding forward when the vehicle comes into collision.

The volume of the air bag 88 of the air bag device 84 is smaller than that of a conventional air bag which is deployed widely in front of the upper body of an occupant. Additionally, as shown in FIG. 14, the vent hole 116 is blocked by a part of the air bag 88 during the deployment, thereby preventing the gas from leaking. Therefore, it takes a quite short time to deploy the air bag 88 completely. Furthermore, it is possible to reduce the capacity of the inflator 90. In the above embodiment, the air bag 88 comprises two panels 104 and 106, sewn together; however, the present invention may be applied to air bags having other structure. The air bag device 84 may be used as an air bag device for protecting an occupant in the rear seat as well by mounting it in the seat back 100.

As described above, the lugs are provided to the driver side air bag device of the present invention, thereby preventing the extension of the air bag toward the occupant at the initial stage of the deployment and allowing the air bag to be deployed quickly between the steering wheel and the upperbody of the occupant. The air bag only requires to provide the lugs instead of the tether belts, and therefore, can be easily manufactured. Further, by eliminating the tether belts, the packaging volume of the folded bag can be reduced.

The air bag device for an occupant in the passenger or the rear seats according to the present invention is designed to protect an occupant by restraining the waist portion of the occupant, and allows a smaller volume of the air bag in comparison with a conventional air bag device for an occupant in the passenger seat. Therefore, reduction of both the time taken to deploy the air bag and the capacity of the inflator is made possible. Also, the air bag prevents the lower body of an occupant not wearing seat belt from sliding forward when the vehicle comes into collision.

What we claimed is:

1. An air bag device to be mounted in a steering wheel of a vehicle comprising, an air bag having a peripheral border;

an inflator for generating gas to deploy said air bag;

a retainer to which said air bag and said inflator are attached;

a cover attached to said retainer to cover said air bag; and at least one lug provided on the peripheral border of said air bag and projecting outwardly from the air bag, said lug being connected to said retainer at an outside of the air bag when the air bag device is assembled, said lug having tear strength to be torn by tensile force applied to said air bag after said air bag is deployed in front of said retainer in the process of the deployment of said air bag.

2. An air bag device as claimed in claim 1, wherein said air bag has a vent hole between said lug and a rear center of said air bag.

3. An air bag device as claimed in claim 1, wherein said air bag comprises a front panel and a rear panel superposed on each other and sewn at the peripheries thereof with a thread to form said peripheral border;

said lug is separate from said panels and is inserted between the peripheries of said panels and then sewn to said panels with said thread.

4. An air bag device as claimed in claim 1, wherein said air bag comprises a front panel and a rear panel superposed on each other and bonded peripheries thereof to each other to form said peripheral border; and said lug projects from one of said panels.

5. An air bag device as claimed in claim 1, further comprising:

an opening disposed in said lug;

small holes surrounding an opening disposed in the retainer of said air bag; and a fixing member inserted through said opening of said lug and one of said small holes in order to attach said air bag to said retainer.

6. An air bag device as claimed in claim 1, wherein said lug has a base portion thinner than the top thereof.

7. An air bag device to be mounted in front of a seat of a vehicle comprising:

an air bag having a tip side in a direction of deployment;

an inflator for generating gas to deploy said air bag;

a casing to which said air bag and inflator are attached;

a lid attached to said casing to cover said air bag; and a lug provided on said air bag at the tip side thereof and projecting outwardly from the air bag, said lug being connected to said casing at an outside of the air bag when the air bag device is assembled, said lug having tear strength to be torn by tensile force applied to said air bag after said air bag is deployed in front of said casing in the process of the deployment of said air bag.

8. An air bag device as claimed in claim 7, wherein said air bag has a vent hole between said lug and a rear center of said air bag.

9. An air bag device as claimed in claim 7, wherein said air bag comprises:

an upper panel and a lower panel superposed on each other and at the peripheries thereof sewn up with a thread; and said lug is separate from said panels and is inserted between the peripheries of said panels and then sewn to said panels with said thread.

10. An air bag device as claimed in claim 7, wherein said air bag comprises an upper panel and a lower panel superposed on each other and bonded at peripheries thereof to each other; and said lug projects from one of said panels.

11. An air bag device as claimed in claim 7, wherein said air bag has an opening disposed in said lower panel, at an end opposite to an occupant, to introduce gas spouted out from said inflator.

12. An air bag device as claimed in claim 11, further comprising:

an opening disposed in said lug;

small holes surrounding said opening disposed in said lower panel for introducing gas from said inflator; and a fixing member inserted through said opening of said lug and one of said small holes in order to attach said air bag to said casing.

13. An air bag device as claimed in claim 7, wherein said lug has a base portion thinner than the top thereof.

14. An air bag device as claimed in claim 1, wherein said lug has a length to allow the peripheral border of the air bag to be located adjacent the retainer when the lug is fixed to the retainer.

15. An air bag device as claimed in claim 7, wherein said lug has a length to allow the tip side of the air bag to be located adjacent the casing when the lug is fixed to the casing.

* * * * *